(No Model.) 2 Sheets—Sheet 1.
G. F. SIMONDS.
BALL BEARING.

No. 501,374. Patented July 11, 1893.

Witnesses.
Wm. H. Gaskin
Robert Errett

Inventor.
George F. Simonds.
By
James L. Norris.
Atty.

(No Model.) 2 Sheets—Sheet 2.

G. F. SIMONDS.
BALL BEARING.

No. 501,374. Patented July 11, 1893.

Witnesses.
Wm. H. Gaston
Robert Everett

Inventor
George F. Simonds
By
James L. Norris.
Atty

UNITED STATES PATENT OFFICE.

GEORGE F. SIMONDS, OF FITCHBURG, MASSACHUSETTS.

BALL-BEARING.

SPECIFICATION forming part of Letters Patent No. 501,374, dated July 11, 1893.

Application filed November 18, 1892. Serial No. 452,448. (No model.)

*To all whom it may concern:*

Be it known that I, GEORGE F. SIMONDS, a citizen of the United States, residing at Fitchburg, in the county of Worcester and State of Massachusets, have invented new and useful Improvements in Ball-Bearings, of which the following is a specification.

This invention relates to that class of bearings in which spherical rollers or balls are confined in annular ball retaining cages in position to project radially therefrom at the inner and outer surfaces of the cage and to roll freely in all directions, with free lateral play, on and against the inner and outer concentric surfaces of a bearing, for the purpose of sustaining the radial pressure or weight of shafts, axles, wheels, pulleys and other rotary bodies, in such a manner as to diminish friction, distribute and lessen wear, avoid heating and decrease or prevent noise.

My present invention is an improvement on annular ball retaining cages of the character described in Letters Patent No. 449,959 and No. 449,963, granted to me April 7, 1891, and it consists in the combination, with spherical rollers or balls for diminishing friction and sustaining radial pressure or weight in a ball bearing, of an annular cage composed of separate ball-retaining compartments, each comprising an annular series of elongated open sided chambers parallel with the longitudinal axis of the cage, and an intermediate spacing and connecting portion in which no balls can be carried, the balls in the said separate compartments being thereby adapted to act in unison and capable of removal and replacement in a body with said cage, as hereinafter described and claimed.

Figure 1:
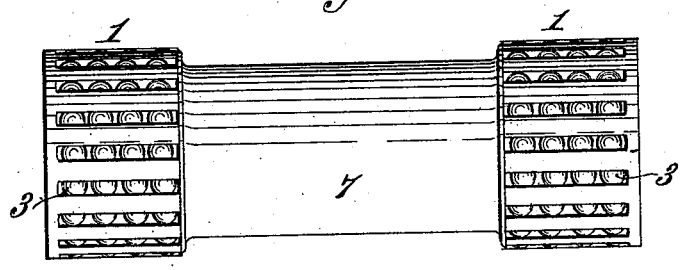
Figure 2:
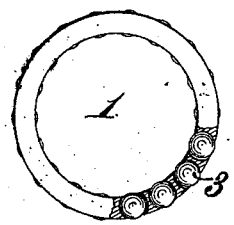
Figure 4:
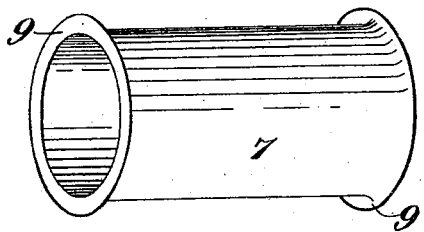
Figure 3:
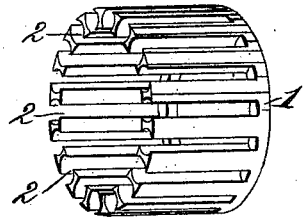
Figure 5:
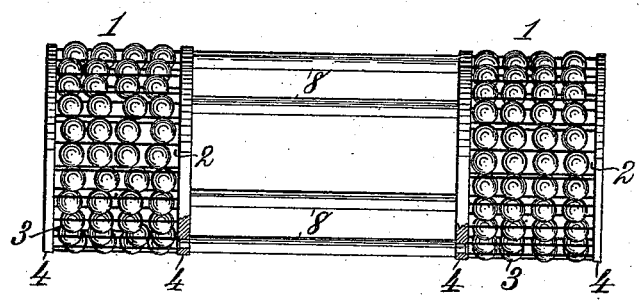

In the annexed drawings illustrating the invention—Figure 1 is a side elevation of one form of annular ball retaining cage embodying my improvements. Fig. 2 is an end elevation of the same, partly broken away. Fig. 3 is a detail view of one of the separate ball retaining compartments. Fig. 4 is a view of a tubular connecting and spacing portion by which the separate ball retaining compartments are connected. Fig. 5 is a side elevation of a modified form of annular ball retaining cage, and Fig. 6 is a sectional end elevation of the same partly broken away.

Referring to the drawings, the numeral 1 designates the separate annular ball retaining compartments of my improved cage for receiving and holding annular series or groups of balls in a ball bearing. These cage compartments 1 may be formed, as shown in Figs. 1 and 3, by drilling an annular series of open sided chambers 2 in a metallic ring or hollow cylinder of the required dimensions; said chambers being extended longitudinally from one end of the cylinder nearly to its other end, which may form one closed end of the cage, as shown in Figs. 1, 2 and 3. The chambers 2 are provided, as shown, with open or slotted sides through which the spherical rollers or balls 3 placed in the several chambers of the annular compartment are permitted to project radially both within and on the outside of the cage in position to bear against and roll freely in all directions on the inner and outer concentric surfaces of the bearing in which said cage of balls is to be inserted.

If preferred the ball retaining compartments 1 may be composed of parallel end rings 4 connected by wire rods 5 and 6 extended only the length of each compartment as shown in Fig. 5. These wire rods 5 and 6 are arranged in concentric annular sets, as shown in Fig. 6, at sufficient distances apart to form elongated spaces or chambers 2 adapted to receive and retain the spherical rollers or balls and at the same time permit them to project in position to sustain radial pressure or weight.

Figure 6:
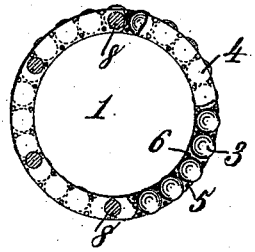

The separate annular ball retaining compartments 1 may be connected to each other and spaced a suitable distance apart either by means of a tubular shell 7, Figs. 1 and 4, or by means of a single annular series of wire rods 8, Figs. 5 and 6. This connecting or spacing portion of the cage is not designed or adapted to receive rollers or balls, but serves the purpose of spacing apart the annular ball retaining compartments so that they will occupy their required positions in the bearing, and at the same time rigidly connects said compartments in such a manner as to cause them to revolve together and in unison. When the tubular connecting and spacing shell 7 is to be applied to annular compartments of the construction shown in Figs. 1 and 3 it should be preferably provided with flared ends 9, Fig. 4, that will facilitate its secure attachment to the annular cage compartments and at the same time close the open ends of the annular series of elongated chambers.

An annular ball retaining cage of the construction described, having separate annular ball compartments connected by a spacing portion in which no balls can be carried, is designed for insertion into those bearings that do not require the use of balls throughout their entire length, but in which it is desirable to have the separated groups of balls act in unison and be capable of being handled in a body.

The cage is removable from and independent of the bearing surfaces against which the balls are to act, and the balls in each elongated chamber of the annular ball retaining compartments are so arranged as to have free lateral play therein and be capable of revolving freely in all directions so that wear and friction will be evenly distributed and greatly lessened.

The cage is light, durable and comparatively inexpensive, and furnishes a convenient means for applying or removing separate groups of spherical rollers or balls in a body.

What I claim as my invention is—

The combination, with spherical rollers or balls for diminishing friction and sustaining radial pressure or weight in a ball bearing, of an annular cage composed of separate ball retaining compartments, each comprising an annular series of elongated open sided chambers parallel with the longitudinal axis of the cage, and an intermediate spacing and connecting portion in which no balls can be carried, the balls in the said separate compartments being thereby adapted to act in unison and capable of removal and replacement in a body with said cage, substantially as described.

In testimony whereof I have hereunto set my hand in presence of two subscribing witnesses.

GEORGE F. SIMONDS.

Witnesses:
  A. R. BROWN,
  GEO. W. REA.